L. RENAULT.
MEANS FOR LUBRICATING THE TRANSMISSION GEAR OF MOTOR VEHICLES.
APPLICATION FILED APR. 9, 1910.
1,020,054.
Patented Mar. 12, 1912.
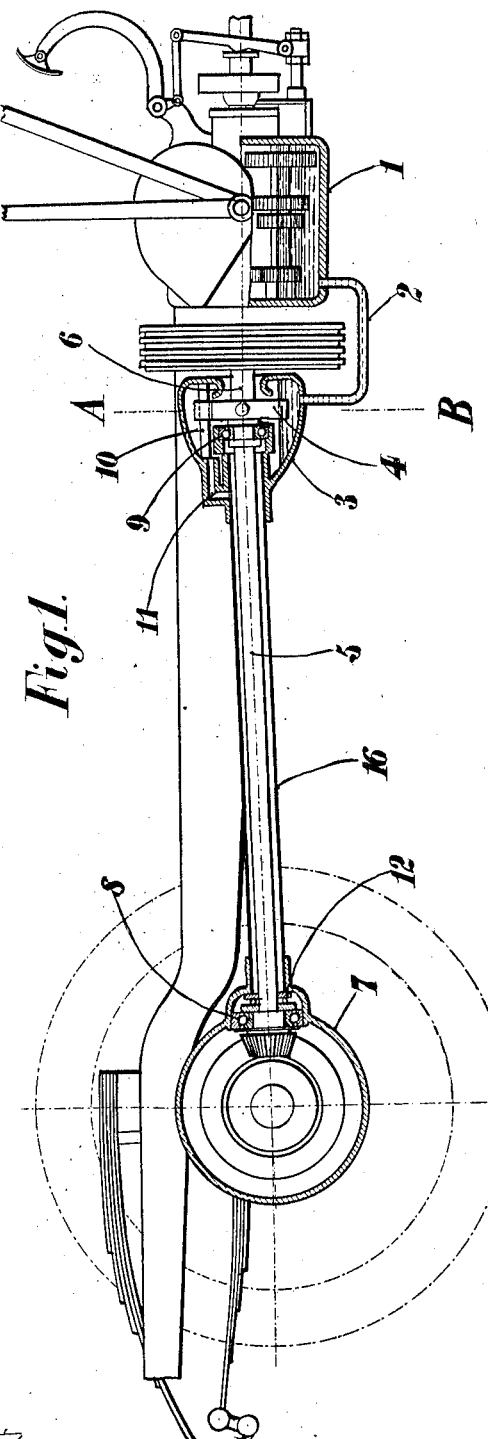
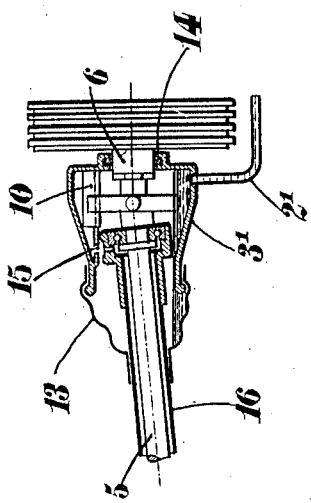
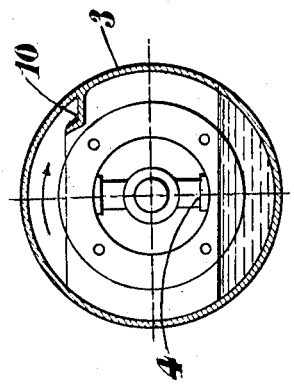

UNITED STATES PATENT OFFICE.

LOUIS RENAULT, OF BILLANCOURT, FRANCE.

MEANS FOR LUBRICATING THE TRANSMISSION-GEAR OF MOTOR-VEHICLES.

1,020,054. Specification of Letters Patent. Patented Mar. 12, 1912.

Application filed April 9, 1910. Serial No. 554,548.

*To all whom it may concern:*

Be it known that I, LOUIS RENAULT, a citizen of the French Republic, residing at Billancourt, Department of the Seine, in France, have invented certain new and useful Improvements in and Relating to Means for Lubricating the Transmission-Gear of Motor-Vehicles; and I do hereby declare the following to be a full, clear, and exact description of the invention, such as will enable others skilled in the art to which it appertains to make and use the same.

The present invention has for its object a device for automatically lubricating the transmission gear and the rear axle of automobile vehicles driven through a universal joint, by utilizing for this lubrication the lubricant serving for the change speed gear.

The invention is carried out by connecting the box of the change speed and the gear case in which the front joint of the transmission shaft moves, in such a manner that the dipping of the joint in the oil causes a part of the latter to flow as far as the rear axle of the vehicle.

Two embodiments of the invention are illustrated by way of example in the accompanying drawing, in which:

Figure 1 is a side elevation partly in section of a vehicle provided with the device forming the object of the invention. Fig. 2 is a section on the line A—B in Fig. 1. Fig. 3 is a partial section of the second embodiment of the invention.

The gear case 1 for the change speed gear, in the lower part of which the lubricant required for lubricating the pinions is contained in the usual manner, communicates through a slightly flexible tube 2 with the lower part of the case 3 inclosing the front end of the transmission shaft 5. The dimensions of the several parts are such that the universal joint 4 enters the oil slightly, the level of this oil being substantially the same in the case 3 and in the change speed box 1. The joint 4 unites the transmission shaft 5 and the shaft 6 with the change speed gear box.

The shaft 5 rotates in the interior of the tube 16, which is invariably connected on the one hand with the case 3 and on the other hand with the casing 7 fixed to the rear axle and inclosing the differential. The rotation of the shaft 5 in the tube 16 takes place in bearings 8 and 9, preferably ball bearings.

Owing to the fact that the joint 4 enters the oil in the case 3, the oil is projected to the upper part of the case, where it is partly collected in a gutter 10 of suitable form (Fig. 2). Thence it flows through a passage 11 into the annular space existing between the shaft 5 and the tube 16; it thus penetrates as far as the rear axle and insures the lubrication of the bearing 8, the thrust bearing 12 and of the other parts inclosed in the casing 7.

The object of making the tube 2 flexible is to permit of play of the Cardan joint 4, which is likewise insured because the shaft 6 is able to slide slightly in the direction of its length.

In the modification represented in Fig. 3, the object aimed at is to prevent with certainty leakages of oil which might occur between the case 3 and the shaft 6. With this object, the case $3^1$ is not directly connected with the tube 16; it is fixed like the change speed gear box and the shaft 6 rotates in the interior of this casing with the interposition of suitable joints 14. The connection between the case $3^1$ and the tube 16 is insured by a flexible dust protector 13. The operation is the same as in the arrangement previously described; the dipping of the joint in the oil projects it into the gutter 10 from which it escapes through the orifices 15 and effects the lubrication in the manner already described.

I claim:

1. In an automobile, the combination with the transmission shaft and the universal joint connected therewith, of a tube surrounding said shaft and leading backward from said joint to the rear axle, a case surrounding the universal joint, a change speed gear case in front of said last named case and adapted to hold a body of oil, and a flexible tube connecting said change speed case with the case around said universal joint.

2. In an automobile, the combination with the transmission shaft, the universal joint at the forward portion thereof, and the change speed gear located in front of said universal joint, of lubricant-containing cases inclosing the universal joint and the change speed gear respectively, a flexible tube connecting the lower portions of said cases, a tube surrounding the transmission shaft and leading backward from the universal joint to the rear axle, and a gutter in the upper part of the case for the universal joint into which the oil is thrown by the rotation of said joint, said gutter leading to the upper part of said transmission shaft tube.

3. In an automobile, the combination with the transmission shaft, the universal joint at the forward portion thereof, and the change speed gear located adjacent to said universal joint, of lubricant containing cases inclosing the universal joint and change speed gear respectively, means to convey the oil from the first of said cases to the second, a tube surrounding the transmission shaft and leading backward from the universal joint to the rear axle, and means in the case for the universal joint to convey the oil from said case to the said transmission shaft tube.

In testimony whereof I affix my signature, in presence of two witnesses.

LOUIS RENAULT.

Witnesses:
H. C. COXE,
EMILE KLOTZ.